(12) United States Patent
Tanner (10) Patent No.: US 9,393,733 B2
(45) Date of Patent: Jul. 19, 2016

(54) INSPECTION AND EJECTOR UNIT (71) Applicant: M. TANNER AG, Illnau (CH)

(72) Inventor: Marcel Tanner, Bassersdorf (CH)

(73) Assignee: M. TANNER AG, Illnau (CH)

( * ) Notice: Subject to any disclaimer, the term of this patent is extended or adjusted under 35 U.S.C. 154(b) by 0 days.

(21) Appl. No.: 14/480,886

(22) Filed: Sep. 9, 2014

(65) Prior Publication Data

US 2015/0068958 A1    Mar. 12, 2015

(30) Foreign Application Priority Data

Sep. 10, 2013   (CH) ...................................... 1561/13

(51) Int. Cl.
| | |
|---|---|
| *B07C 5/00* | (2006.01) |
| *B29C 49/80* | (2006.01) |
| *B29C 49/42* | (2006.01) |
| *B29C 49/56* | (2006.01) |
| *B29C 49/06* | (2006.01) |
| *B29K 67/00* | (2006.01) |
| *B29L 31/00* | (2006.01) |

(52) U.S. Cl.
CPC ............ *B29C 49/80* (2013.01); *B29C 49/4205* (2013.01); *B29C 49/4236* (2013.01); *B29C 49/4252* (2013.01); *B29C 49/56* (2013.01); *B29C 49/06* (2013.01); *B29C 2049/563* (2013.01); *B29K 2067/003* (2013.01); *B29L 2031/7158* (2013.01)

(58) Field of Classification Search
CPC ............ B07C 5/02; B07C 5/10; B07C 5/122; B07C 5/126; B29C 49/80; B29C 49/2405; B29C 49/4236
USPC ......... 209/522, 523, 524, 526, 529, 577, 644; 250/223 B
See application file for complete search history.

(56) References Cited

U.S. PATENT DOCUMENTS

| | | | | |
|---|---|---|---|---|
| 3,975,260 | A | * | 8/1976 | Peyton .................... B07C 5/122 198/441 |
| 4,104,343 | A | * | 8/1978 | Cornelius .................... 264/40.1 |
| 5,591,462 | A | | 1/1997 | Darling et al. |
| 6,145,668 | A | * | 11/2000 | DePauw et al. ................ 209/510 |
| 7,679,758 | B2 | * | 3/2010 | Wei et al. ....................... 356/625 |

FOREIGN PATENT DOCUMENTS

| | | |
|---|---|---|
| EP | 1925575 | 5/2008 |
| EP | 2206565 | 7/2010 |
| EP | 2633978 | 9/2013 |

* cited by examiner

*Primary Examiner* — Mark Beauchaine
(74) *Attorney, Agent, or Firm* — Notaro, Michalos & Zaccaria P.C.

(57) ABSTRACT

An inspection and ejector unit for preforms for plastic containers in a transportation line, has at least one driver device which picks up preforms travelling from an inward conveyor device to the inspection and ejector unit, transports them further and passes on at least some of the preforms to an outward conveyor device, at least one detection device by which faulty preforms in the driver device are detected, and at least one ejection device by which preforms which are detected as faulty are removed from the driver device, and a corresponding method.

31 Claims, 5 Drawing Sheets

INSPECTION AND EJECTOR UNIT

FIELD AND BACKGROUND OF THE INVENTION

The present invention relates to an inspection and ejector unit for preforms for plastic containers in a transportation line, and to a corresponding method.

A transportation line having a clamping conveyor for preforms for, for example, PET bottles, without an inspection and ejector unit, is described, for example, in EP 1 925 575 A1.

SUMMARY OF THE INVENTION

The object of the present invention is to provide a transportation line for such preforms with a means of reliably detecting and eliminating faulty preforms, by which means the transportation flow in the transportation line is adversely affected as little as possible.

This object is achieved firstly in accordance with the present invention by an inspection and ejector unit for preforms for plastic containers in a transportation line, comprising at least one driver device which picks up preforms travelling from an inward conveyor device to the inspection and ejector unit, transports them further and passes on at least some of the preforms to an outward conveyor device, at least one detection device by means of which faulty preforms in the driver device are detected and at least one ejection device by means of which preforms which are detected as faulty are removed from the driver device, and by a method for detecting and removing faulty preforms for plastic containers in a transportation line, having the following steps: (a) picking up preforms, supplied by an inward conveyor device, in corresponding recesses of a driver device, (b) transporting the individual preforms along a defined distance (S) from the inward conveyor device in the direction of an outward conveyor device, (c) producing images of the individual preforms in the driver device by means of at least one camera of a detection device in a position (P1), preferably at the start of the distance (S), (d) evaluating the images of the individual preforms in an evaluation unit of the detection device, (e) transmitting a signal from the evaluation unit to at least one ejection device if a preform has been detected as faulty, and (f) removing the faulty preform in a position (P2) on the distance (S) which is located downstream of the position (P1), by means of the at least one ejection device.

In one preferred embodiment of the present invention, the driver device is configured in the form of a cam wheel or star wheel which is driven about a vertical axis (X). A preform more preferably enters into engagement with each recess of the cam wheel. In this way, particularly efficient individuation and precise inspection of the incoming preforms can be achieved. The preforms preferably rest with their collar or support ring on the cam wheel, wherein recesses of the cam wheel corresponding accordingly to the essentially cylindrical part of the preforms. In other words, the preforms enter into engagement with the cam wheel in an essentially positively locking fashion. Other types of engagement such as, for example, a (purely) frictional engagement or else a positive and frictional engagement are however basically also conceivable. The preferred drive about the vertical axis is due to the fact that the preforms preferably pass into the inspection and ejector unit in an upright position (i.e. with the open end upwards).

In a further preferred embodiment of the present invention, the detection device has at least one camera and one evaluation unit. With the camera, the preforms are captured and examined for faults such as an oval shape, collar damage or support ring damage and mouth damage by means of image processing methods. In this context, for example a comparison is carried out with setpoint data stored in the evaluation unit for the preforms which are to be respectively inspected. In the case of a defined difference from the corresponding setpoint data, a signal is then generated in the evaluation unit, which signal is transmitted to the corresponding ejection device in order to eliminate or eject the faulty preform. Depending on the type and number of the cameras used it is possible, in certain circumstances, also to check the surface condition and the base condition of the preforms.

In another preferred embodiment of the present invention, the ejection device is a pneumatic ejection device which is preferably configured in the form of an air pipe or else an air nozzle. As a result, the faulty blanks can be reliably ejected in a simple and cost-effective way. By means of the air pipe it is possible, if appropriate, to convey a larger quantity of air than with the air nozzle, while with the air nozzle a higher air speed can be achieved than with the air pipe. The selection as to what type of pneumatic ejection device is used depends in each case on the circumstances, i.e. for example on the type, size and the weight of the preforms to be inspected. In general, the use of an air pipe is preferred at present.

In yet a further preferred embodiment of the present invention, the ejection device is a mechanical ejection device which is preferably configured in the form of a tappet. Such a mechanical ejection device ensures equally reliable ejection of faulty preforms with reduced consumption of air.

In yet another preferred embodiment of the present invention, the ejection device ejects the preforms from bottom to top in a vertical direction. This has proven particularly expedient, economical in terms of time and less susceptible to faults. In this context, a discharge shaft, by means of which the ejected preforms are discharged, for example, into a collecting device, is particularly preferably also provided in an aligned arrangement above the ejection device. With the aid of the discharge shaft it is ensured that the ejected preforms do not drop back into the transportation line and cause faults there. In addition, the faulty preforms can therefore easily be collected.

Further preferably, the discharge shaft has a U-shaped or arcuate configuration as well as an additional air nozzle or else an additional air pipe. As a result of the U-shaped or arcuate configuration, the faulty preforms can be quickly directed into a corresponding collecting container. The additional air nozzle or the additional air pipe promotes the discharging of the faulty preforms. The preforms are therefore carried through the discharge shaft on an air cushion. In this way, a preform which is ejected can be particularly reliably prevented from dropping back.

In an alternative embodiment of the inspection and ejector unit according to the invention, the ejection device initially lifts up the preforms from bottom to top in a vertical direction (i.e. without already completely ejecting the latter). This lifting up can take place by means of a tappet, but preferably an air nozzle is used which outputs a brief vertical pulse of air which lifts up the corresponding preform by a specific distance (preferably by 1 to 2 times its length) so that it can subsequently be ejected laterally or can pass into a correspondingly arranged collecting container (i.e. the preform must be lifted up at least to such an extent that reliable discharging is possible without the occurrence of sticking or a blockage). Above the driver device, a further ejection device is provided for the lateral discharge, by means of which ejection device the lifted-up preforms are ejected or blown out in an essentially horizontal direction in order then to be directed into the correspondingly arranged collecting device. A discharge shaft, by means of which under certain circumstances preforms which have been lifted up to an excessive degree can still be deflected into the collecting device, is in turn preferably provided in an aligned arrangement above the ejection device/devices. The further ejection device is preferably arranged in the discharge shaft or in the region of the discharge shaft, particularly preferably in a side wall of the discharge shaft. The further ejection device can be configured as a tappet, but an air nozzle is again preferably used, which air nozzle outputs an essentially horizontal pulse of air. This pulse of air is generally longer than the pulse of air of the vertical air nozzle. The horizontal air nozzle can have, in particular, a plurality of nozzle openings; in this way it is possible to ensure that the lifted-up preforms are reliably conveyed away from the driver device into the collecting container, since a larger area or larger space can be covered.

In a preferred embodiment of the method according to the invention, the ejection according to step (f) takes place in a pneumatic or mechanical fashion, preferably in a vertical direction from bottom to top, as already explained above.

In a further preferred embodiment of the method according to the invention, the preforms are discharged through a discharge shaft which is provided in an aligned arrangement above the ejection device, wherein preferably an additional air nozzle or else an additional air pipe, which is activated, under certain circumstances, at the same time as the ejection device, is present in the discharge shaft. In this way, it is ensured in a particularly effective fashion that the ejected preform is conveyed "seamlessly" through the discharge shaft without the preform being able to drop back onto the transportation line or onto the cam wheel.

In another preferred embodiment of the method according to the invention, the driver device has a vertically driven cam wheel, and the distance (S) describes approximately an arc, preferably an approximately 90° arc and particularly preferably an approximately 120° arc. According to this configuration, smooth (further) transportation of the preforms from the inward conveyor device (generally a run-off rail) to the outward conveyor device (generally a clamping conveyor) can be achieved. The camera is arranged here in the starting region of the semicircular distance (S), i.e. preferably adjacent to the run-in of the preforms into the cam wheel, for example via the second or third recess of the cam wheel along the distance (S). More preferably, the position (P2) in which the faulty preforms are ejected is approximately 30° downstream of the position (P1) along the arc. In this way, in all cases a sufficiently long "reaction time" remains for the evaluation unit to check the image of the respective preform and, if appropriate, output a signal for the ejection of a faulty preform to the ejection device. However, it is also possible to limit the distance (S) over which images of the preforms are recorded from the run-off rail up to the outputting of the non-faulty preforms to the clamping conveyor, for example to a circular arc of less than 90°, if this is necessary, for example, for reasons of space or for other reasons. The camera and ejection device would then be correspondingly closer to one another. On the other hand, it is, of course, also possible to lengthen the distance (S) to an arc of approximately 180° or 270°, if this is necessary for reasons of space or for other reasons.

In one alternative embodiment of the method according to the invention, the faulty preform is (initially) lifted up from bottom to top in the vertical direction in order then to be ejected in the horizontal direction, specifically in each case either in a pneumatic or mechanical fashion (i.e. in each case either by means of a tappet or an air nozzle). In this context, a vertical and (subsequently) an essentially horizontally oriented air nozzle are preferably used, wherein the vertical air nozzle outputs a brief vertical pulse of air onto the bottom of the respective preform, by means of which pulse of air the preform is lifted up by a specific distance (preferably by 1 to 2 times its length) with the result that it can be reliably ejected or can pass into the corresponding collecting container (i.e. it must be lifted up at least to such an extent that reliable discharging is possible without the occurrence of sticking or a blockage). Above the driver device, the further essentially horizontally oriented ejection device (i.e. generally a horizontal air nozzle) is provided, by means of which ejection device the lifted-up preforms are ejected in an essentially horizontal direction or blown into the correspondingly arranged collecting device. The lifting up of the faulty preform preferably takes place by means of a first pulse of air L1 with a period t1 from the ejection device, and the ejection of the faulty preform preferably takes place t2 by means of a second pulse of air L2 with a period from the further ejection device, wherein the period t2 is preferably longer than the period t1. This measure also serves to reliably discharge the faulty preform. It has proven particularly reliable if the period t1 of the first pulse of air L1 is between 50 and 200 ms, preferably between 80 and 120 ms, and the period t2 of the second pulse of air L2 is between 1 and 3 s, preferably between 1.5 and 2.5 s.

Furthermore, it has proven particularly expedient if the inspection and ejector unit according to the invention is integrated into a clamping conveyor. In this context, for example the non-faulty preforms are transferred directly from the cam wheel (or, for example, via a bridge) into a belt conveyor device, wherein the collar of the preforms is clamped into corresponding grooves in the belt.

Furthermore, the preforms are preferably conveyed by a run-off rail to the inspection and ejector unit.

BRIEF DESCRIPTION OF THE DRAWINGS

An exemplary embodiment of the present invention is illustrated in the appended drawings for the sake of better clarity.

In the drawings.

DESCRIPTION OF THE PREFERRED EMBODIMENTS

Figure 1:
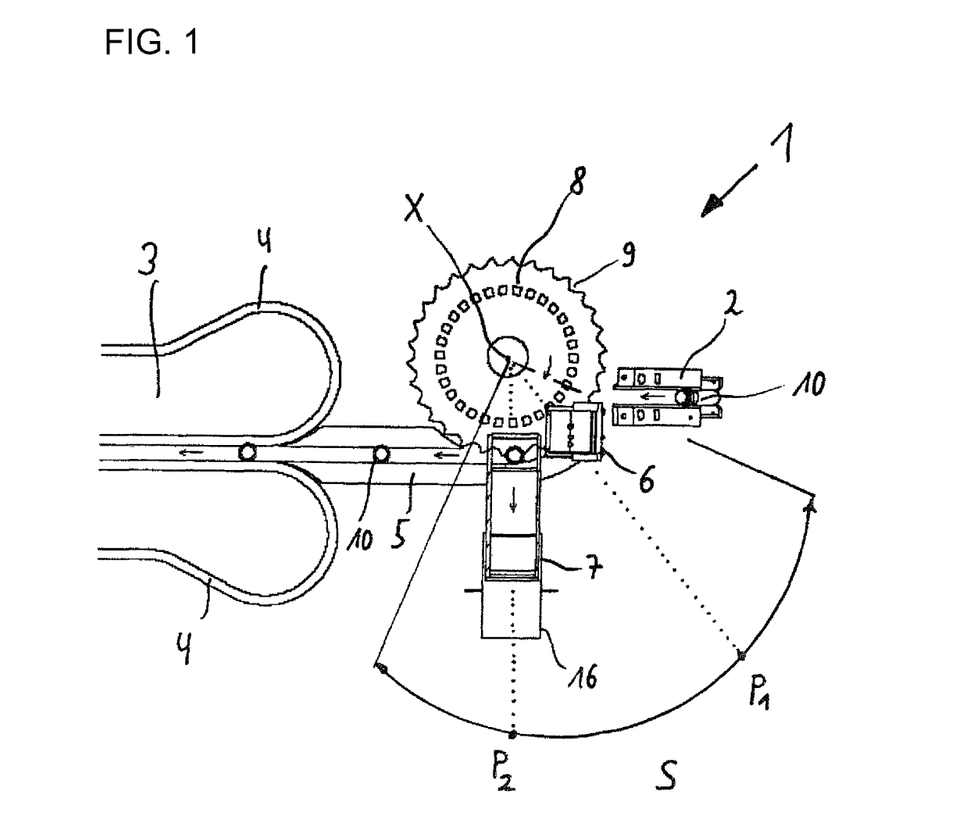
FIG. 1 shows a plan view of an inspection and ejector unit according to the invention.

As shown in FIG. 1, firstly a preform 10 is conveyed from the run-off rail 2 to the inventive inspection and ejector unit 1. The cam wheel or star wheel 8 has recesses 9, by which the preform 10 can be picked up and transported further. The distance which a preform 10 travels in the cam wheel or star wheel 8, i.e. in engagement with one of the recesses 9, is denoted by S.

At the end of the distance S, the preform 10 is transferred by means of a bridge 5 to a clamping conveyor 3, i.e. to the belts 4 thereof, which generally have grooves into which the collar of the preform 10 is clamped. The cam wheel or star wheel 8 is driven about the vertical axis X.

The incoming preform 10 is therefore conveyed along the distance S by the recess 9 respectively lying opposite the run-off rail 2. At a first position P1 along the distance S, a detection device 6 is arranged here. The detection device 6 generally comprises at least one camera and an evaluation unit. Images of the preform 10 are produced by means of the at least one camera, said images being compared with setpoint values of a fault-free preform using image processing methods, in order to determine whether for example oval shapes, support ring damage or collar damage, mouth damage or similar defects are present. If a predefined deviation, with respect to, for example, the round shape, the condition of the collar or the mouth condition, is discovered when the comparison with the setpoint values of the fault-free preform is carried out, the evaluation unit of the detection device 6 transmits a signal to an ejection device 17 which is arranged further downstream from the detection device 6 along the distance S in the position P2 (cf. FIG. 2). In FIG. 1, the ejection device 17 is, however, not shown since a discharge shaft 7, with which the ejected, that is to say the faulty, preforms 10 are transferred into a corresponding collecting container 16 (cf. FIG. 2), is provided above it, in an aligned arrangement.

The distance S describes approximately an arc of 90° from its start to its end. The positions P1 and P2 of the detection device 6 and of the ejection device 17 are generally distributed approximately uniformly at 30° and 60° (or else 20° and 70°) of the 90° arc. Relatively large and relatively small arcs with, under certain circumstances, different distances are conceivable, depending on requirements.

Figure 2:
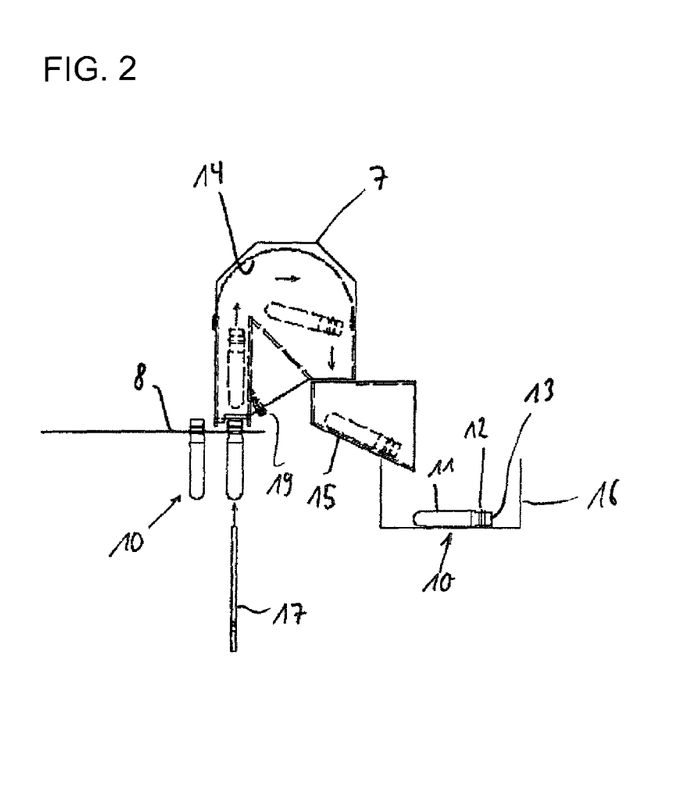
FIG. 2 shows a side view, in particular of a discharge shaft of an inventive inspection and ejector unit with an adjoining collecting container.

FIG. 2 illustrates, in particular, the ejection process. The ejection device 17, here in the form of an air pipe, conveys the preform 10, which has been detected as faulty, out of the corresponding recess 9 of the cam wheel or star wheel 8 and into the discharge shaft 7 by means of a pulse of air or an air stream. The ejection process therefore takes place in a vertical direction from bottom to top. Within the generally U-shaped discharge shaft 7, the faulty preform 10 is deflected from a rounded inner wall 14 of the discharge shaft 7, wherein it is subsequently fed into the collecting container 16 via an (inclined) slide 15, which adjoins the discharge shaft 7 or is part of the discharge shaft 7. It is apparent that the preforms 10 have an essentially cylindrical body 11, a surrounding collar or support ring 12 and a circular mouth 13.

An additional air nozzle 19 or an additional air pipe, with which the discharge of the faulty preforms 10 can be assisted so that they are carried through the discharge shaft 7 on an air cushion, can be provided in the discharge shaft 7.

Figure 3:
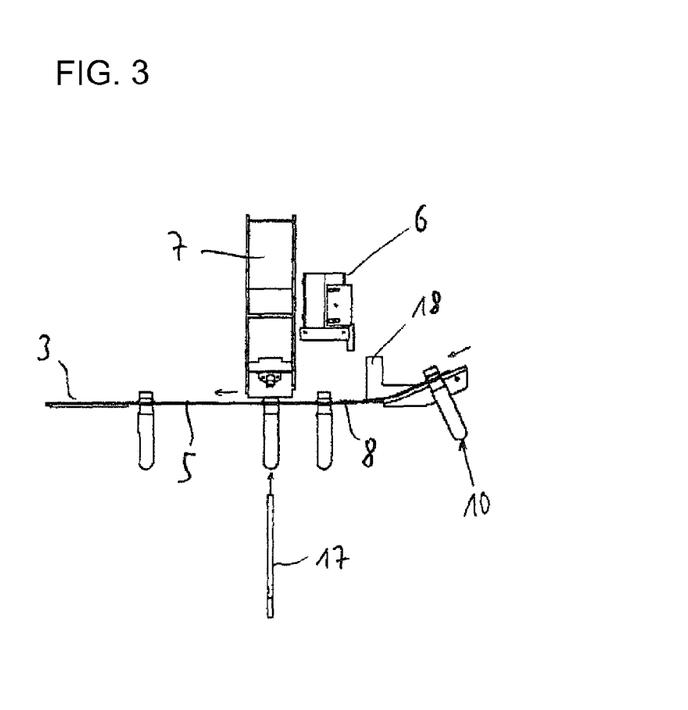
FIG. 3 shows a front view, in particular of a discharge shaft and of a detection device of an inspection and ejector unit according to the invention.

FIG. 3 shows once more a preform 10 coming from the (inclined) run-off rail 2. In the region of the junction with a corresponding recess 9 of the cam wheel or star wheel 8, a signaling unit 18 can be provided which signals the incoming preforms 10 to the detection device 6. The preforms 10 run past underneath the detection device 6 to the ejection device 7 or the air pipe where preforms 10 which are detected as being faulty are ejected in the vertical direction from bottom to top and pass via the discharge shaft 7 into the collecting container 16 (cf. FIG. 2). The fault-free preforms 10 are passed on to the clamping conveyor 3 via the bridge 5. The preforms 10 otherwise rest with their surrounding collar 12 (or support ring) on the recesses 9 of the cam wheel or star wheel 8.

Figure 4:
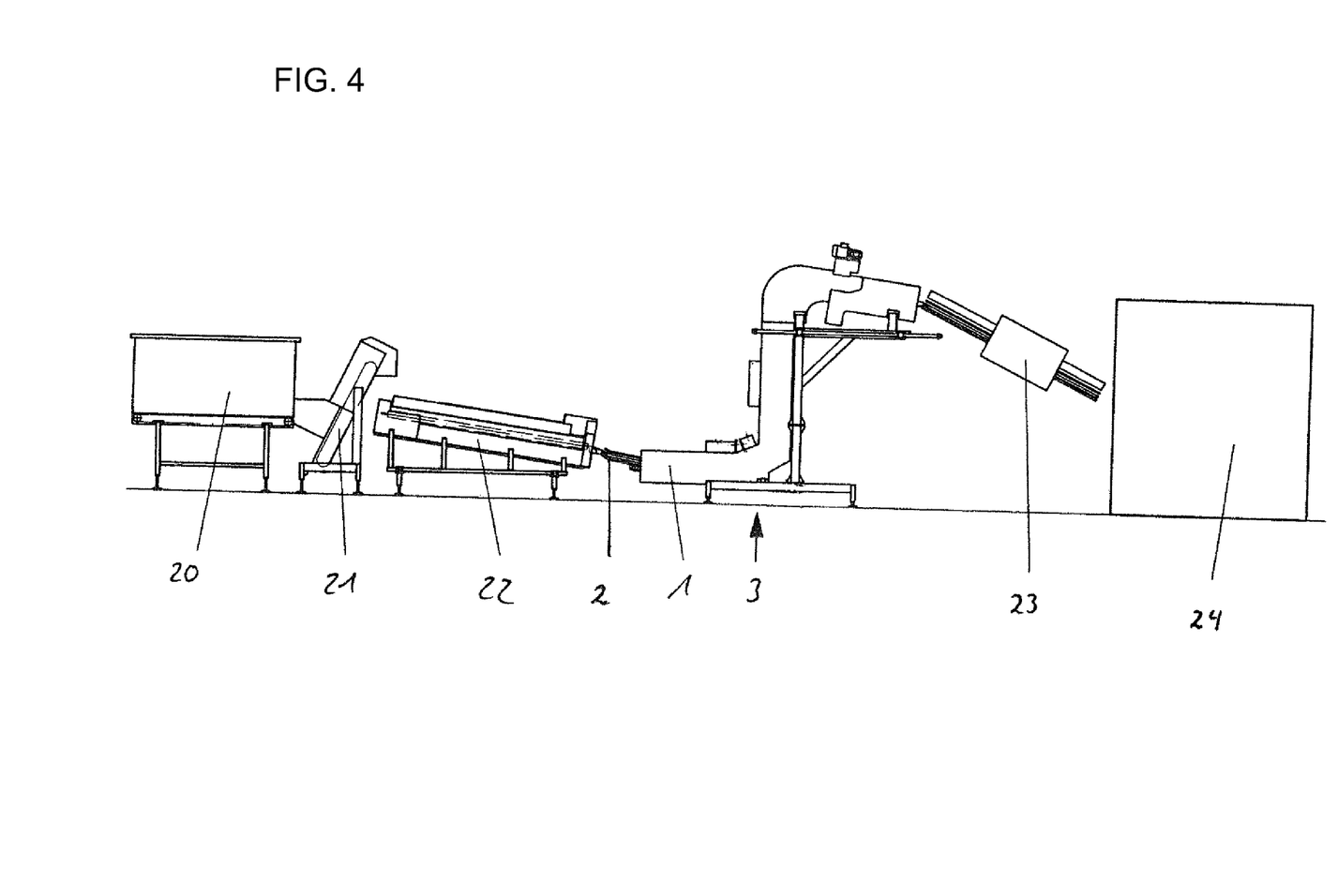
FIG. 4 shows a side view of an exemplary transportation line with the preferred installation location for the inspection and ejector unit according to the invention.

Finally, FIG. 4 also illustrates by way of example a transportation line for preforms 10 in a production line for manufacturing, for example, PET bottles.

In this context, the preforms 10 pass from a feeding device 20 to a vertical conveyor 21 which passes on the preforms 10 to a roller sorter 22. From there, the preforms pass via a run-off rail 2, now in individuated form, into the inspection and ejector unit 1 according to the invention, which is preferably arranged inside the clamping conveyor 3. In the clamping conveyor 3, the fault-free preforms 10 are, under certain circumstances, also rinsed with ionized air and normal air (preferably upside down with vertically positioned air nozzles) and subsequently passed on to a transfer device 23. Here, the preforms 10 are, under certain circumstances, also irradiated with ultraviolet light before they are then passed on to a shaping device 24, for example a stretch blow molder.

Figure 5:
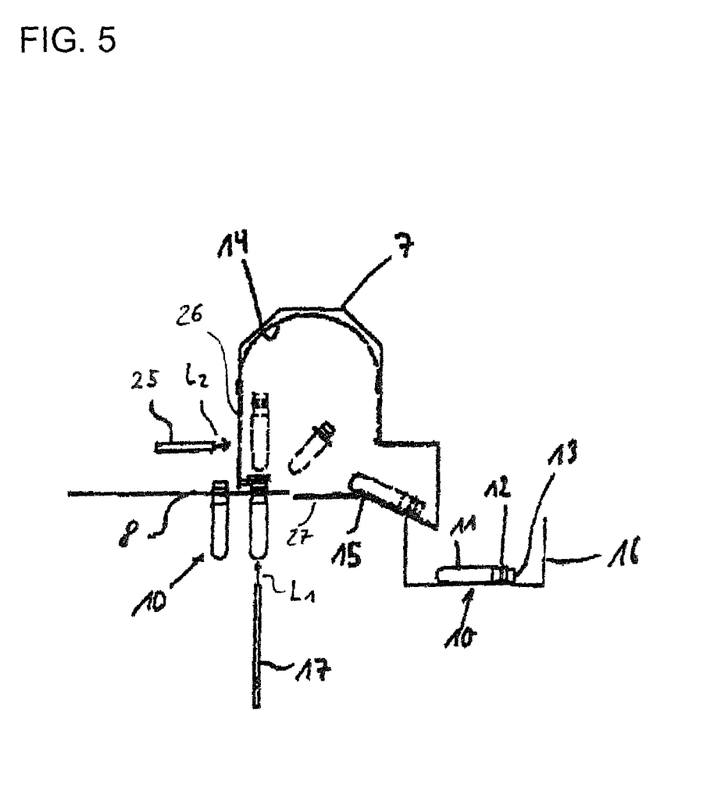
FIG. 5 shows a side view of an alternative embodiment of a discharge shaft of an inspection and ejector unit according to the invention with an adjoining collecting container.

An alternative embodiment of the present invention is illustrated in FIG. 5. The ejection device 17 (here in the form of an air nozzle or an air pipe) lifts up the preform 10 which has been detected as faulty out of the corresponding recess 9 of the cam wheel or star wheel 8 by means of a brief, vertical pulse of air L1, with the result that said preform 10 can be blown out in an essentially horizontal direction into the collecting container 16, specifically by means of the pulse of air L2, by the further ejection device 25, which is generally arranged in or in the region of the side wall 26 of the discharge shaft 7 above the driver device 8. In an "essentially horizontal direction" means here that the further ejection device 25 or the horizontal air nozzle can also be inclined slightly upward or downward if necessary in order to ensure problem-free discharging of the faulty preforms 10. The pulse of air L2 is generally longer in duration than the pulse of air L1 in order to ensure that all the faulty preforms 10 pass into the collecting container 16. The (bent) side wall in which the air nozzle 19 is arranged according to FIG. 2 was omitted in this embodiment and the further ejection device 25 is correspondingly arranged on the opposite side of the discharge shaft 7. The, in turn, U-shaped discharge shaft 7 also has again a rounded inner wall 14 in order, under certain circumstances, to divert, and also direct reliably into the collecting container 16, preforms 10 which, for example in the case of a possible fault, have experienced an excessively strong vertical pulse of air L1 and/or have not experienced any horizontal pulse of air L2. In this embodiment, an inclined slide 15 is also generally arranged in front of the collecting container 16. In this embodiment, the inclined slide has a horizontal section 27 which extends in the direction of the driver device 8 in order to receive the horizontally blown-out preforms 10, with the result that they can be subsequently directed via the slide into the collecting container 16.

It is again apparent that the preforms 10 have an essentially cylindrical body 11, a surrounding collar or support ring 12 and a circular mouth 13.

Figure 6:
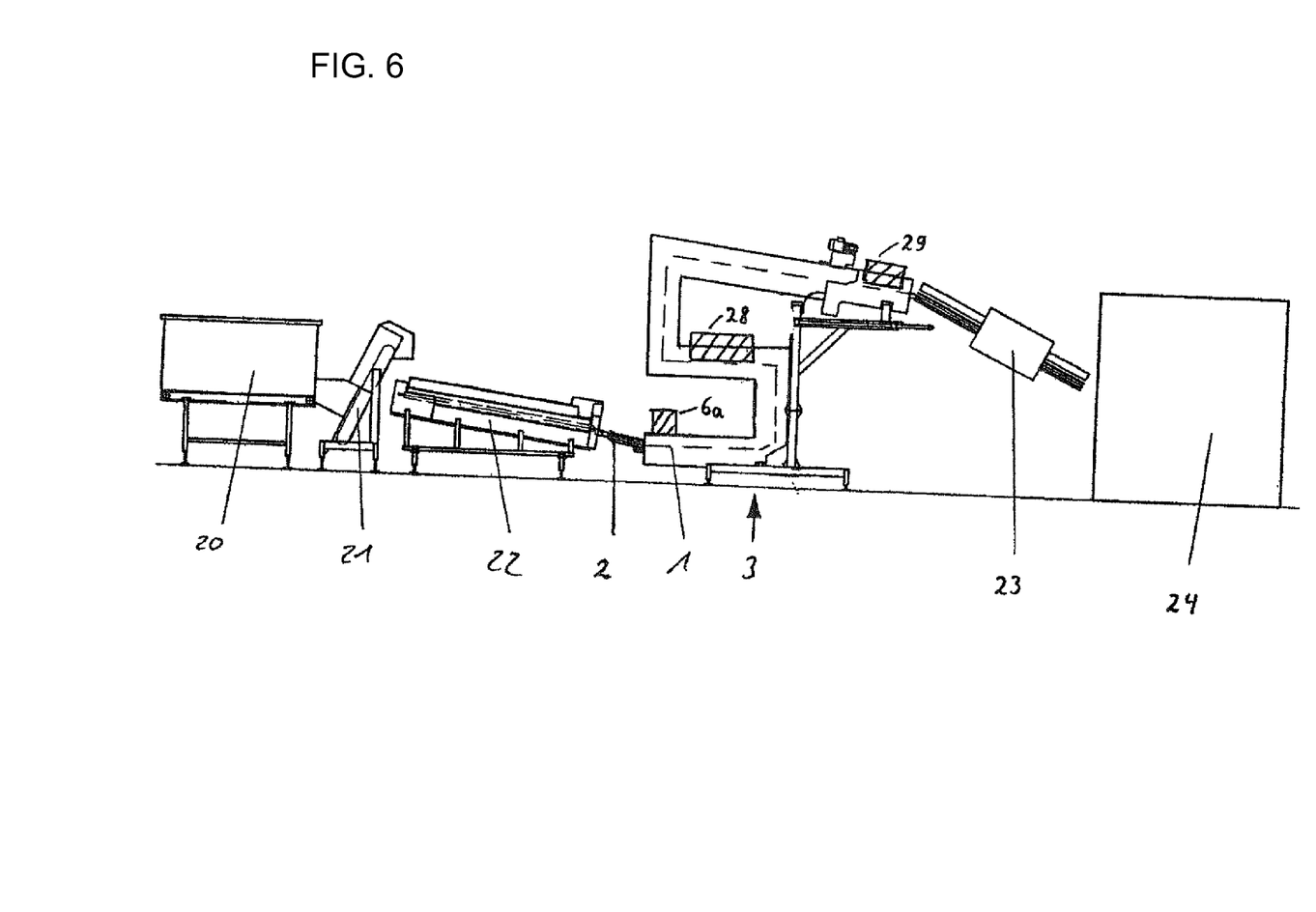
FIG. 6 shows a side view of a particularly preferred transportation line with the respectively preferred installation location for the inspection and ejector unit according to the invention.

Finally, FIG. 6 illustrates a particularly preferred transportation line for preforms 10 in a production line for manufacturing, for example, PET bottles. In this context, the preforms 10 pass again from a feeding device 20 to a vertical conveyor 21, which passes the preforms 10 on to a roller sorter 22. From there, the preforms pass via a run-off rail 2—now individuated—into the inspection and ejector unit 1 according to the invention (i.e. firstly into the detection device with a camera 6a and, under certain circumstances, an evaluation unit) which is preferably arranged inside the clamping conveyor 3 which is configured here in an S shape. In the center part of the S-shaped clamping conveyor 3 a rinser 28 is provided in which the fault-free preforms 10 (i.e. those which have not been ejected) are rinsed upside down, by means of vertically positioned air nozzles, with ionized and/or normal air, and subsequently irradiated in the output region of the clamping conveyor 3 with ultraviolet light from an ultraviolet light source 29. The preforms 10 are then passed on to a transfer device 23 where, if necessary, they can be irradiated once more with ultraviolet light before they are then passed on to a shaping device 24, for example a stretch blow molder.

LIST OF REFERENCE SYMBOLS

1 Inspection and ejector unit
2 Run-off rail (inward conveyor device)
3 Clamping conveyor (outward conveyor device)
4 Belt
5 Bridge
6 Detection device
6a Camera
7 Discharge shaft
8 Cam wheel (driver device)
9 Recesses
10 Preform
11 Cylindrical body
12 Collar
13 Mouth
14 Inner wall discharge shaft
15 Slide
16 Collecting container
17 Ejection device
18 Signaling unit
19 Additional air nozzle of the discharge shaft
20 Feeding device
21 Vertical conveyor
22 Roller sorter
23 Transfer device
24 Shaping device (stretch blow molder)
25 Further ejection device
26 Side wall (of the discharge shaft)
27 Horizontal section (of the slide)
28 Rinser
29 Ultraviolet light source
X Vertical drive axis
S Distance
P1 Position 1
P2 Position 2
L1 First pulse of air
L2 Second pulse of air
t1 Period of first pulse of air
t2 Period of second pulse of air

The invention claimed is:

1. An inspection and ejector unit for plastic preforms for plastic containers in a transportation line upstream of a blow molding machine, the plastic preforms having an elongate hollow cylindrical body with a surrounding collar, the inspection and ejector unit comprising
at least one driver device (8) which picks up plastic preforms (10) travelling from an inward conveyor device (2) to an inspection and ejector device (1), transports them further and passes on at least some of the plastic preforms (10) to an outward conveyor device (3), wherein the driver device (8) is a star wheel with recesses (9) which receive the cylindrical bodies (11) of the plastic preforms (10) with positive fit but without additional force-locking and on which the surrounding collars (12) of the plastic preforms (10) rest during the transport;
at least one detection device (6) by means of which faulty plastic preforms (10) in the star wheel (8) are detected; and
at least one ejection device (17, 25) by means of which plastic preforms (10) which are detected as faulty are removed from the star wheel (8), wherein
a first pneumatic ejection device (17) lifts up a faulty plastic preform (10) from bottom to top by means of a vertical air pulse (L1), and wherein a second pneumatic ejection device (25) is provided above the star wheel (8) by means of which the lifted-up faulty plastic preform (10) is ejected in an essentially horizontal direction by means of a horizontal air pulse (L2), the horizontal air pulse (L2) being longer in duration than the vertical air pulse (L1), the duration of the horizontal air pulse (L2) being at least 1 second.

2. The inspection and ejector unit as claimed in claim 1, characterized in that the driver device (8) is driven about a vertical axis (X).

3. The inspection and ejector unit as claimed in claim 1, characterized in that a plastic preform (10) enters into engagement with a recess (9) of the star wheel (8).

4. The inspection and ejector unit as claimed in claim 1, characterized in that the detection device (6) has at least one camera and one evaluation unit.

5. The inspection and ejector unit as claimed in claim 1, characterized in that the ejection device (17) is a pneumatic ejection device which is configured in the form of an air pipe.

6. The inspection and ejector unit as claimed in claim 1, characterized in that the ejection device (17) is a mechanical ejection device.

7. The inspection and ejector unit as claimed in claim 1, characterized in that a discharge shaft (7), by means of which the ejected plastic preforms (10) are discharged is provided in an aligned arrangement above the ejection device (17).

8. The inspection and ejector unit as claimed in claim 7, characterized in that the discharge shaft (7) has a U-shaped configuration and comprises an additional air nozzle (19) or else an additional air pipe.

9. The inspection and ejector unit as claimed in claim 1, characterized in that a discharge shaft (7) is provided in an aligned arrangement above the ejection device (17), by means of which, under certain circumstances, plastic preforms (10) which have been lifted up to an excessive degree are discharged.

10. The inspection and ejector unit as claimed in claim 9, characterized in that a further ejection device (25) is arranged in the discharge shaft (7).

11. The inspection and ejector unit as claimed in claim 10, characterized in that the further ejection device (25) is arranged in a side wall (26) of the discharge shaft (7).

12. The inspection and ejector unit as claimed in claim 1, characterized in that the ejection device (17) is a pneumatic ejection device which is configured in the form of an air nozzle.

13. The inspection and ejector unit as claimed in claim 1, characterized in that the ejection device (17) is in the form of a tappet.

14. The inspection and ejector unit as claimed in claim 1, characterized in that a discharge shaft (7), by means of which the ejected plastic preforms (10) are discharged into a collecting device (16).

15. The inspection and ejector unit as claimed in claim 1, characterized in that a further ejection device (25) is provided above the driver device (18) by means of which ejection device the lifted-up plastic preforms (10) are ejected in an essentially horizontal direction.

16. The inspection and ejector unit as claimed in claim 1, characterized in that a discharge shaft (7) is provided in an aligned arrangement above the ejection device (17), by means of which, under certain circumstances, plastic preforms (10) which have been lifted up to an excessive degree are discharged into a collecting device (16).

17. A method for detecting and ejecting faulty plastic preforms for plastic containers in a transportation line upstream of a blow molding machine, the plastic containers having an elongate hollow cylindrical body with a surrounding collar, the method comprising the following steps:
- (a) picking up plastic preforms (10), supplied by an inward conveyor device (2), in corresponding recesses (9) of a driver device (8), the driver device (8) being a star wheel the recesses (9) of which receive the cylindrical bodies (11) of the plastic preforms (10) with positive fit but without any additional force-locking wherein the surrounding collars (12) of the plastic preforms (10) rest on said recesses (9);
- (b) transporting the individual plastic preforms (10) along a defined distance (S) from the inward conveyor device (2) in the direction of an outward conveyor device (3);
- (c) producing images of the individual plastic preforms (10) in the star wheel (8) by means of at least one camera of a detection device (6) in a position (P1);
- (d) evaluating the images of the individual plastic preforms (10) in an evaluation unit of the detection device (6);
- (e) transmitting a signal from the evaluation unit to at least one ejection device (17, 25) if a plastic preform (10) has been detected as faulty, and
- (f) removing the faulty plastic preform (10) in a position (P2) on the distance (S) which is located downstream of the position (P1), by means of a first pneumatic ejection device (17) which lifts up a faulty plastic preform (10) from bottom to top by means of a vertical air pulse (L1), and a second pneumatic ejection device (25) which ejects the lifted-up faulty plastic preform (10) in an essentially horizontal direction by means of a horizontal air pulse (L2), the horizontal air pulse (L2) being longer in duration than the vertical air pulse (L1), the duration of the horizontal air pulse (L2) being at least 1 second.

18. The method as claimed in claim 17, characterized in that step (f) comprises ejecting the faulty plastic preform (10) in a mechanical fashion.

19. The method as claimed in claim 17, characterized in that the plastic preforms (10) are discharged through a discharge shaft (7) which is provided in an aligned arrangement above the ejection device (17).

20. The method for detecting and ejecting faulty plastic preforms for plastic containers in a transportation line as claimed in claim 17, wherein the at least one camera of a detector device 6 in a position (P 1), as recited in step (c) is at the start of distance (s).

21. The method as claimed in claim 17, characterized in that the distance (S) describes approximately an arc.

22. The method as claimed in claim 21, characterized in that the position (P2) in which the faulty plastic preforms (10) are ejected is at least 30° downstream of the position (P1) along the arc.

23. The method as claimed in claim 21, characterized in that the position (P2) in which the faulty plastic preforms (10) are ejected is at least 30° downstream of the position (P1) along the arc.

24. The method as claimed in claim 17, characterized in that the lifting up of the faulty plastic preform (10) takes place by means of a first pulse of air (L1) with a period (t1) from the ejection device (17), and the ejection of the faulty plastic preform (10) takes place by means of a second pulse of air (L2) with a period (t2) from a further ejection device (25).

25. The method as claimed in claim 24, characterized in that the period (t1) of the first pulse of air (L1) is between 50 and 200 ms. and the period (t2) of the second pulse of air (L2) is between 1 and 3 s.

26. The method as claimed in claim 24, characterized in that the period (t1) of the first pulse of air (L1) is between 80 and 120 ms, and the period (t2) of the second pulse of air (L2) is between 1 and 3 s.

27. The method as claimed in claim 17, characterized in that the plastic preforms (10) are discharged through a discharge shaft (7) which is provided in an aligned arrangement above the ejection device (17), wherein an additional air nozzle (19) or else an additional air pipe, which is activated, under certain circumstances, at the same time as the ejection device (17), is present in the discharge shaft (7).

28. The method as claimed in claim 17, characterized in that the distance (S) describes an approximately 90° arc.

29. The method as claimed in claim 17, characterized in that the distance (S) describes an approximately 120° arc.

30. The method as claimed in claim 17, characterized in that the lifting up of the faulty plastic preform (10) takes place by means of a first pulse of air (L1) with a period (t1) from the ejection device (17), and the ejection of the faulty plastic preform (10) takes place by means of a second pulse of air (L2) with a period (t2) from a further ejection device (25).

31. The method as claimed in claim 30, wherein the period (t2) of the second pulse of air (L2) is greater than the period (t1) of the first pulse of air (L2).

* * * * *